Sept. 22, 1964

R. L. JAMES ETAL 3,150,303

PROPORTIONAL CONTROL TWO-PHASE SERVOMOTOR AMPLIFIER

Filed May 2, 1961

INVENTORS
ROBERT L. JAMES
HAROLD MOREINES
HARRY B. WATTSON

BY Herbert L. Davis
ATTORNEY

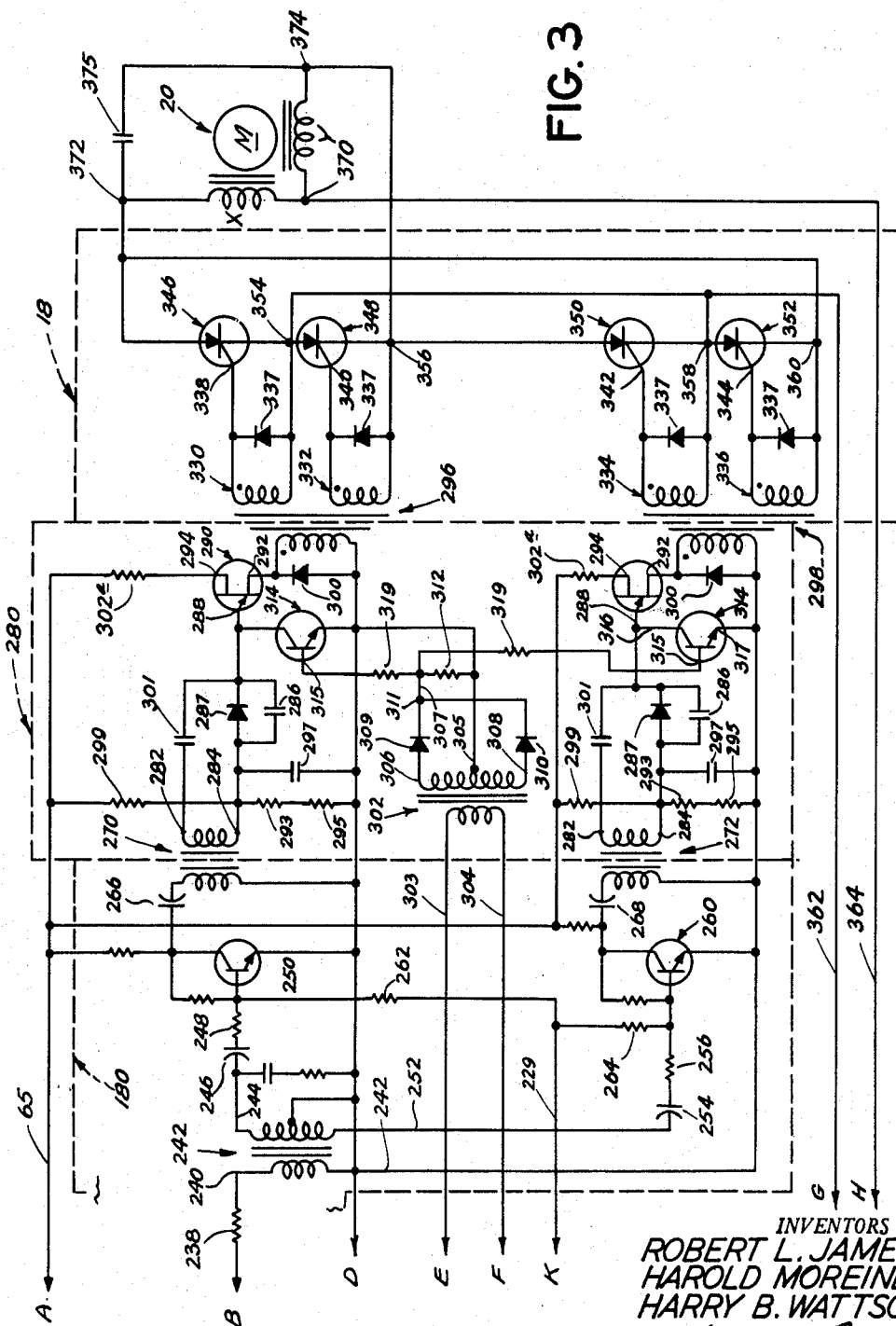

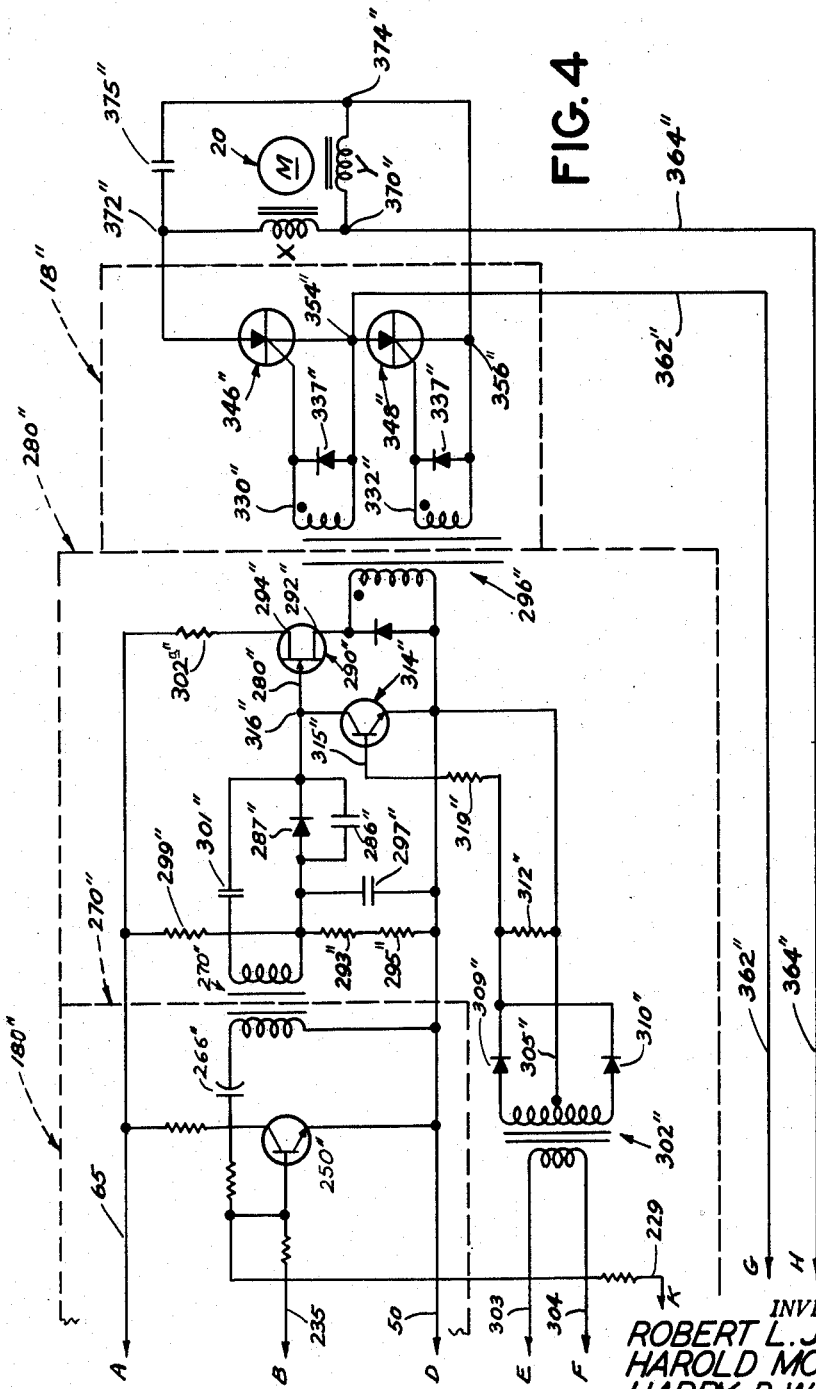

United States Patent Office 3,150,303
Patented Sept. 22, 1964

3,150,303
PROPORTIONAL CONTROL TWO-PHASE SERVOMOTOR AMPLIFIER
Robert L. James, Bloomfield, Harold Moreines, Springfield, and Harry B. Waitson, Rutherford, N.J., assignors to The Bendix Corporation, Teterboro, N.J., a corporation of Delaware
Filed May 2, 1961, Ser. No. 107,151
7 Claims. (Cl. 318—28)

This invention relates to control systems for electric servo motors and more particularly to a proportional control system utilizing controlled rectifiers for controlling a two-phase electric servo motor.

Servomechanisms utilizing two-phase motors are well known wherein a magnetic amplifier is used to amplify the servo motor error signal fed into the control system. In the past, magnetic amplifiers have been employed in servos having control power requirements up to 50 watts. Servos of this type provide a maximum of 0.25 shaft horse power. Above this power rating magnetic amplifiers have been found to be unsatisfactory because of their large size and weight. In contrast, controlled rectifiers having comparable power ratings are small in size and very light weight, hence, very desirable for servo mechanism use. For example, a controlled rectifier capable of delivering 500 watts provides a 26:1 weight advantage and a 52:1 space advantage over a magnetic amplifier capable of delivering only 50 watts.

Accordingly, it is a principal object of this invention to provide a light weight compact high power output control system utilizing controlled rectifiers for controlling a two-phase electric servo motor.

Another limitation imposed by the use of magnetic amplifiers in servo motor control systems is that magnetic amplifiers have a significant lag which severely limits the attainable servo bandpass and consequently does not provide satisfactory power to output devices for high performance applications.

It is, therefore, another important object of this invention to provide a control system utilizing controlled rectifiers for continuously controlling a two-phase electric servo motor which responds substantially instantaneously to an error signal.

The control system embodying controlled rectifiers for controlling the two-stage electric servo motor of the instant invention is, in the preferred embodiment, a proportional control system wherein the controlled rectifier output is employed to symmetrically drive both control phases of the electric servo motor. This type of operation reduces the heat dissipation problem inherent in fixed phase operations and permits shaping of the electric motor torque speed curve to obtain a given maximum power output with a minimum size motor, without introducing single phasing problems. The symmetrical driving of both phases of the electric servo motor, however, results in a motor torque proportional to the square of the input voltage. To provide linear motor torque the error signal is modified by a square root circuit and the modified error signal is applied to the motor.

The controlled rectifiers used in the control system of the instant invention have a non-linear gain in their firing curve.

It is, therefore, a further important object of this invention to provide means for compensating for the non-linearity in the controlled rectifier firing curve.

The duration of the pulses which the controlled rectifiers of the instant invention supply to the electric servo motor depends on the time in each half cycle of anode supply voltage the controlled rectifiers receive a gating pulse.

It is, therefore, a further important object of this invention to provide controlled rectifier means having an anode-cathode circuit connected to a reference voltage and operatively connected to an electric servo motor, means for position modulating a controlled rectifier gating pulse with respect to time in direct response to a variable error signal from the electric servo motor, means for synchronizing the gating pulse with respect to the reference voltage, and means for applying the gating pulse to the controlled rectifier means.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

FIGURE 3 is a schematic wiring diagram of the second portion of the control system of the instant invention embodying a mixer amplifier, pulse generator and controlled rectifier output stage adapted to provide a full wave servo motor drive;

FIGURE 4 is a schematic wiring diagram of the second portion of the control system of the instant invention embodying a mixer amplifier, pulse generator and controlled rectifier output stage of alternative construction adapted to provide half wave servo drive.

Figure 1:
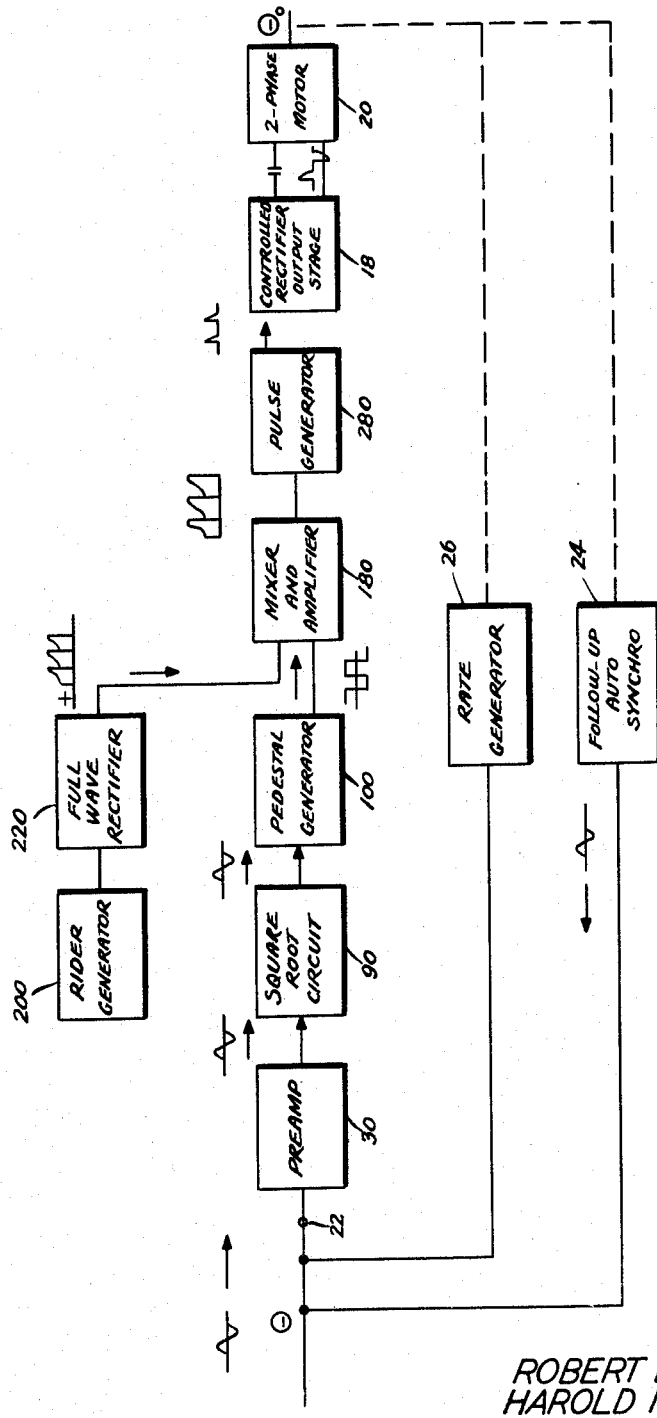
FIGURE 1 is a block diagram of the control system of the instant invention.

Referring now to the drawings and more particularly to FIGURE 1 therein shown in block diagram is the light weight compact control system of the instant invention utilizing controlled rectifiers located in the controlled rectifier stage 18 for pulsing a proportionally controlled two-phase electric servo motor 20 providing a torque which is the square of the input voltage thereto.

The input 22 to the control system receives a suppressed carrier signal in response to a condition which is added algebraically to a displacement signal derived from a follow-up synchro 24 and a rate signal derived from a rate generator 26 driven by servo motor 20. The input error signal is amplified by a preamplifier 30 and the square root of the signal is taken by a square root circuit 90. The amplified square root signal is applied to a pedestal generator means 100 which produces a square wave pedestal voltage varying in amplitude in direct proportion to the error signal. The pedestal voltage is applied to mixer-amplifier means 180.

A rider generator circuit comprised of rider generator 200 and full wave rectifier 220 is also provided. Rider generator 200 produces a wave of increasing monotonic configuration, preferably a cosine function, which is synchronized with respect to a voltage of sinusoidal wave form which is supplied as a reference voltage to the anode cathode circuit of the controlled rectifiers. The full wave rectifier 220 inverts alternate half cycles of the rider voltage to permit symmetrical firing of the controlled rectifiers in each half cycle of controlled rectifier anode voltage. The rider voltage thus formed is fed into the mixer-amplifier means 180 where the rider voltage is superimposed upon the pedestal voltage to form a mixed voltage output signal. The mixed voltage output signal is then fed into pulse generator 280 where it is formed into pulses.

The pulse generator 280 position modulates the mixed voltage with respect to time as a direct function of the amplitude of the error signal. The pulses formed in the pulse generator are then fed into controlled rectifier output stage 18 to control the motor 20.

The rate of speed at which the electric servo motor is driven depends upon the angle in the respective half cycles of controlled rectifier anode supply voltage at which the controlled rectifiers receive a gating pulse. The pulse generator produces a gating pulse in each half cycle of controlled rectifier anode supply voltage with respect to time as a direct function of the error signal.

The manner in which the components of the control system above described are interconnected to perform the functions ascribed thereto will more clearly appear from the following detailed description and operation of components.

Figure 2:
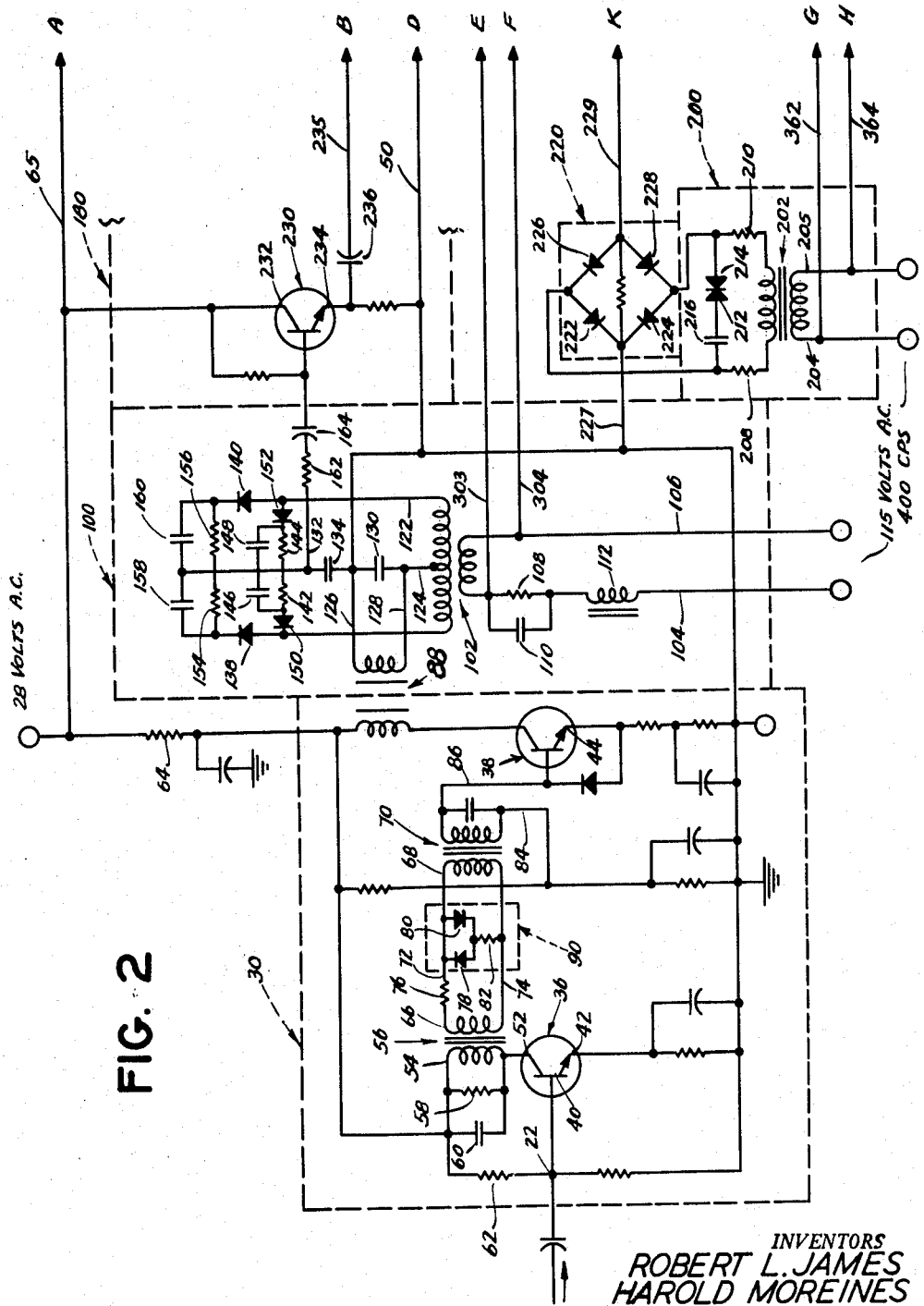
FIGURE 2 is a schematic wiring diagram of a first portion of the control system of the instant invention including a preamplifier, square root generator, pedestal generator, rider generator, and full wave rectifier.

Referring now to FIGURES 2 and 3, the specific constructional details of a preferred embodiment of the invention will now be described.

The preamplifier 30 is comprised of a first stage transistor 36 and a second stage transistor 38. The base 40 of first stage transistor 36 receives the input error signal from input 22. The input 22 and the emitters 42 and 44 of transistors 36 and 38 are connected to common current carrier 50 through appropriate resistance and resistance and capacitor networks.

The collector 52 of first stage transistor 36 is connected to the input winding 54 of coupling transformer 56. A resistance 58 and a capacitor 60 are connected across the input leads of transformer 56. The input leads so connected together are connected through resistance 62 to the control system input 22 and through resistance 64 to line 65 which is connected to a source of power, preferably 28 volts. The output winding 66 of transformer 56 is connected to the input winding 68 of a second coupling transformer 70 by leads 72 and 74. Included in lead 72 is a resistance 76. Diodes 78 and 80 which are inverted with respect to one another are connected between leads 72 and 74 in parallel circuit arrangement through a common resistor 82.

Diodes 78 and 80 together with resistor 82 comprise square root generator circuit 90. The square root generator 90 performs the very important function of providing a square root characteristic to the error signal applied to control system input 22. The output winding of coupling transformer 70 is connected through output lead 84 through a parallel resistance capacitance circuit to common current carrier 50 and through output lead 86 to the base of second stage transistor 38. The output of the second stage transistor 38 is through its collector which is connected to the input winding of coupling reactive transformer 88. It will be readily apparent to one skilled in the art from an anlysis of the structure just described that the preamplifier 30 with the new and novel square root circuit coupled therewith provides low level preamplification of the error signal and additionally modifies the error signal by taking the square root of the error signal so that the torque output of the motor in response to the signal is linear. The preamplifier circuit is connected to pedestal generator 100 through before mentioned reactive coupling transformer 88.

Pedestal generator 100 includes a saturable pulse forming transformer 102 which forms a part of a pulse forming input network. Transformer 102 is connected in series with saturable reactor 112 and parallel connected resistance 108 and capacitance 110 through input leads 104 and 106 to a reference voltage source having a sinusoidal waveform, preferably 115 volts A.C.—400 c.p.s., whereby the saturable transformer 102 is given the desired pulse forming output characteristics.

Saturable transformer 102 is provided with output leads 120 and 122 and a central common output lead 124.

Reactive coupling transformer 88 has two output leads 126 and 128 which are connected to the central output lead 124 of saturable transformer 102 whereby the output signal of the preamplifier 30 is augmented by the voltage of sinusoidal waveform produced in the pulse forming network. A capacitor 130 is interposed in the central output lead 124 of saturable transformer 102 between the output leads 126 and 128 of reactive coupling transformer 88. Pedestal generator 100 is provided with a pedestal generator output lead 132 which is connected to central output lead 124. A capacitor 134 is interposed in the central output lead 124 between pedestal generator output lead 132 and reactive coupling transformer output lead 126. Output leads 120 and 122 are each provided with inversely related blocking diodes 138 and 140, respectively. The output leads 120 and 122 are connected together and to the common central output lead 124 between blocking diodes 138 and 140 and saturable transformer 102 by resistances 142 and 144 having capacitors 146 and 148 in shunt circuit there around which resistances are in series circuit with blocking diodes 150 and 152 and beyond blocking diodes 138 and 140 by resistances 154 and 156 in parallel with capacitors 158 and 160. The pedestal generator circuit is completed by providing pedestal generator output lead 132 with series connected resistance 162 and output capacitor 164.

The specific manner in which pedestal generator 100 produces a square wave pedestal output voltage will now be described. Saturable reactor 112 and saturable transformer 102 provide a pulse forming network which has a sinusoidal waveform output. Blocking diodes 138, 140, 150, and 152 are gated by the input pulses from the pulse forming network to transmit a signal to output capacitor 164 during a 10 to 25 microsecond period at each peak of the sinusoidal reference waveform. These diodes block the discharge of output capacitor 164 which charges rapidly to the signal level during the pulse interval to prevent it from discharging upon removal of the gating pulses. The discharge time constant of the network is greater than the carrier half-period by a factor of 10 so that the pedestal voltage is flat to within 5% of its mean height between pulses.

The pedestal generator provides quadrature rejection as only inphase signals are sampled at peak value. This is a highly desirable feature in that multiple inputs from the transformers 88 and 102 can result in large quadrature components for relatively minor phase deviations of the input voltage. Quadrature components undergo zero-axis crossing during the gating pulse interruption, therefore have negligible effect upon the pedestal level. The resultant output of the pedestal generator 100 is a square waveform the fundamental component of which is in phase with the controlled rectifier anode reference. The square wave pedestal voltage output from the pedestal generator 100 is fed from the storage capacitor 164 to the mixer-amplifier 180.

A rectified rider voltage from the rider generator circuit 200 is also fed into the mixer transistor amplifier 180 where it is superimposed on the pedestal voltage. The rider generator circuit which is comprised of rider generator 200 and full wave rectifier 220 which receives the output from rider generator 200 will therefore be described in detail at this time.

Rider generator 200 is comprised of transformer 202, the input leads 204 and 205 of which are connected to a reference voltage source having a sinusoidal waveform, preferably 115 volts A.C.—400 c.p.s. Input leads 204 and 205 are additionally connected through lead 362 and lead 364 to the controlled rectifiers reference voltage whereby the rider voltage produced by the rider generator is synchronized with respect to the controlled rectifier reference voltage. Transformer 202 has two output leads. One output lead has a resistance 208 therein and the other output lead has a resistance 210 therein.

The output voltage waveform of the rider generator circuit thus far described is a fixed amplitude wave synchronous with the controlled rectifier anode voltage. The increasing monotonic waveform portion of this wave is desirable in the instant application in order to vary the firing angle of the controlled rectifiers. To this end, a capacitor 216 is connected in series with oppositely directed Zener diodes 212 and 214 across the output leads of transformer 202. The capacitor 216 creates a reactive voltage component across the output terminals of rider generator 200 which predominates when either of the Zener diodes 212 or 214 enters the Zener region. The monotonic waveform thus produced at the output terminals of the rider generator 200 is of cosine waveform which has a particularly beneficial effect on the control system as will more clearly appear from the following description.

Full wave rectifier 220 is comprised of diodes 222, 224, 226, and 228 operating in set and connected in parallel with the combination of capacitor 216 and Zener diodes 212 and 214. The diodes 222 and 224 of one set of diodes are oppositely directed with respect to the diodes 226 and 228 of the other set of diodes relative to the input thereto from rider generator 200. Alternate half cycles of the rider generator waveform of increasing monotonic configuration are therefore inverted, permitting symmetrical firing of the controlled rectifiers during each half cycle of controlled rectifier anode voltage. The rider generator circuit just described is connected by common current carrier lead 227 and lead 229 into the circuit of mixer-amplifier 180 to provide a rider generator output circuit.

As before mentioned, the rectified rider generator voltage and the square wave pedestal voltage are fed into the mixer-amplifier 180 from their respective sources where the rectified rider voltage is superimposed upon the pedestal voltage.

The above described portion of the control system is identical in both the preferred embodiment of the invention and the alternative form of the invention. In the preferred embodiment of the invention, the control signal is divided and transmitted to the motor in two control channels to thereby provide a full wave motor drive. In the alternative form of the invention, the control signal is transmitted to the motor in one channel to thereby provide half wave motor drive. The full wave drive is preferred because the controlled rectifiers are fired during each half cycle of controlled rectifier anode voltage thus eliminating D.-C. components through the motor windings and torqueless heating in the motor and providing maximum speed of motor response.

Turning now to the full wave drive shown as a whole in FIGURES 2 and 3 when read together shown therein is the mixer amplifier 180 comprising a dividing network which splits the output of pedestal generator 100. Pedestal generator 100 is connected to the base of transistor 230 through storage capacitor 164. The collector 232 of transistor 230 is connected to power line 65 and the emitter 234 thereof is connected by lead 235 having a capacitor 236 and a resistance 238 series connected therein to the input winding 240 of dividing transformer 242. The output windings of transformer 242 have two output leads 244 and 252 and a center ground connection to the common current conductor 50. Transformer 242 is connected through output lead 244 having a capacitor 246 and resistance 248 therein to the base of transistor 250 and through output lead 252 having a capacitor 254 and resistance 256 therein to the base of transistor 260.

Series connected resistances 262 and 264 are connected between transformer output leads 244 and 252 at their connections to the bases of transistors 250 and 260, respectively. Rider generator 200 is connected to mixer-amplifier 180 by connecting the rider generator output lead 229 between the resistance 262 and 264 whereby the rectified rider voltage is divided between the transistors 250 and 260.

From an analysis of the circuitry just described, it will be readily apparent to one skilled in the art that the pedestal voltage is split into opposite polarity voltage channels and the rectified rider voltage is summed in each of said channels in a parallel resistance network. The resultant opposite polarity mixed output signals are then fed to transistors 250 and 260 respectively where the mixed signals are each amplified to meet gain requirements. Transistors 250 and 260 are each connected by their collectors through capacitors 266 and 268 to the input windings of coupling transformers 270 and 272 respectively.

Mixed signal output voltages of the mixer amplifier 180 are fed through transformers 270 and 272 into identical opposite polarity control channels of pulse generator 280. As each control channel is identical, only one will be described in detail; however, like reference numerals, when applicable, will be applied to like components of both channels.

Pulse generator 280 is comprised of coupling transformer 270 and has two output leads 282 and 284. Output lead 284 is connected through storage capacitor 286, which is in shunt circuit around diode 287, to the emitter 288 of a unijunction transistor 290. Unijunction transistor 290 has a first base 292 and a second base 294. Base 292 is connected to the input winding of coupling transformer 296 and to common current carrier 50 through blocking diode 300. Base 294 is connected through resistance 302a to power lead 65.

Transformer output lead 284 at a point between the transformer output winding and storage capacitor 286 is connected through series resistances 293 and 295 and capacitor 297 in parallel thereto to common current carrier 50 and through resistance 299 to power line 65. Transformer output lead 282 is connected through capacitor 301 to transformer output lead 284 at a point between storage capacitor 286 and unijunction transistor 290.

Unijunction transistor 290 is biased to discharge through base 292 upon receiving a predetermined critical mixed voltage from the mixer-amplifier 180. The critical voltage required for emitter 288 to base 292 conduction is greater than the voltage of storage capacitor 297 by an amount equal to the peak to peak amplitude of the cosine rider voltage. This permits full range of firing angle control of the controlled rectifiers for a change in amplitude of the pedestal voltage equal to this amplitude. From the foregoing, it will be apparent to one skilled in the art that the controller gain is inversely proportional to the cosine rider amplitude. The rider voltage is derived from the controlled rectifier supply which affects the controller gain directly. The overall controller gain is therefore essentially independent of line voltage.

Pulse generator 280 is also provided with a coupling splitting transformer 302. The input winding of transformer 302 is connected through leads 303 and 304 to saturable reactor 112 and to the same sinusoidal reference voltage and in the same manner as saturable pulse forming transformer 102, before described. The output winding of transformer 302 is provided with a center lead 305 which is connected to common current carrier 50 and output leads 306 and 308 which are provided with diodes 309 and 310 therein. Output lead 308 is connected to output lead 306 at point 311 and output lead 307 is connected to center lead 305 through resistance 312.

Each channel of the pulse generator is provided with a synchronizing transistor 314 having a base 315, collector 316 and emitter 317. Each of the synchronizing transistors 314 receives a synchronizing control signal through transformer 302.

The base 315 of each synchronizing transistor 314 is connected to the output lead 307 of coupling splitting saturable transformer 302 through a resistance 319; collectors 316 are connected to transformer output leads 284 between storage capacitor 286 and unijunction transistor 288; and their emitters 317 are connected to common current carrier 50.

The output of the opposite polarity pulse generator channels is through the first base of unijunction transistor 292 of each unijunction transistor 290 through saturable coupling transformers 296 and 298, respectively, to the controlled rectifier output stage 18.

The output of mixer-amplifier 180 is in series with storage capacitor 297 and the cyclically occurring control signal therefrom is combined with the voltage across capacitor 297. When this combined voltage exceeds the unijunction critical voltage, the emitter to base resistance of transistor 290 drops, permitting the storage capacitor 297 to discharge through the input winding of coupling transformer 296. The capacitor energy is augmented by additional current flow through resistor 299 which is sufficient to hold the unijunction transistor in the conducting condition for the remainder of the half-cycle during which firing occurs. It is necessary to cut off the unijunction transistor after firing prior to the succeeding half cycle so that the next gating pulse can be generated. This is accomplished by applying positive synchronizing pulses to base 315 of synchronizing transistor 314 derived from the pedestal generator 100. During the second half cycle the combined voltage again exceeds the unijunction critical voltage of transistor 290 and transistor 290 conducts, but at a later firing angle because of the wave form of the voltage from mixer-amplifier 180. The synchronizing transistor thus activated shunts the emitter 288 of unijunction transistor 290 thus permitting it to recycle. Alternatively, the unijunction transistor 290 may be permitted to revert to a relaxation oscillation mode commencing with the first firing pulse causing a series of pulses to be applied to the controlled rectifier gate. However, this mode could result in a relatively high value of gating energy applied during negative-anode conditions. Since the average gating energy must be kept low to prevent destructive effects upon the controlled rectifier, the single firing pulse technique is preferred.

Saturable transformers 296 and 298 are designed to saturate at a predetermined flux level thus limiting the volt-second integral of output and maintaining the average energy applied to the gating terminals at a safe level. Transformers 296 and 298 each have two isolated sets of output windings 330, 332 and 334, 336 as the controlled rectifier cathodes are not at common potential.

Each output winding has a diode 337 across its output terminals to prevent transient overshoots. The positive output terminals of transformer output windings 330, 332 and 334, 336 are connected to the gating terminals 338, 340, 342 and 344 of preferably solid state silicon controlled rectifiers 346, 348, 350 and 352. The negative output terminals of said transformer output windings 330, 332, 334, and 336 are connected to the controlled rectifier anode cathode circuit at points 354, 356, 358, and 360, respectively. The controlled rectifier output stage circuit is completed by connecting the controlled rectifier anode cathode circuit to phases X and Y of electric servo motor 20 which has a capacitor 375 interposed between its X and Y phases to maintain said phases 90 electrical degrees out of phase with respect to each other and supplying the controlled rectifier anode-cathode circuit with a reference voltage preferably of sinusoidal wave form from the same source of supply as that of the rider generator 200.

To this end, leads 362 and 364 which are connected to a 115 volt A.C.—400 c.p.s. reference voltage are connected to the controlled rectifier anode cathode circuit and motor 20 as follows: lead 362 is connected to the anodes of controlled rectifiers 348 and 352 at points 354 and 358, respectively, and lead 364 is connected between the X and Y phases of the electric motor 20 at point 370. Each set of controlled rectifiers 346, 348, and 350, 352 are connected to the X and Y phase of motor 20 as follows: The anode of controlled rectifier 346 is connected to motor phase X at point 372 and the cathode of controlled rectifier 348 is connected to motor phase Y at point 374. The anode of controlled rectifier 350 is connected to motor phase Y at point 374 and the cathode of controlled rectifier 352 is connected to motor phase X at point 372.

The controlled rectifiers at standby conditions are biased to fire at equal angles less than 180°. The current outputs then cancel in the motor windings to produce zero torque. By unbalancing the controlled rectifier outputs at standby conditions, a smoth increase in motor torque in either direction may be effected. The controlled rectifiers receive a gating pulse at their gating terminals to unbalance the controlled rectifiers from standby condition. To this end, the controlled rectifiers receive a positive gating pulse and act as A.C. switches firing on alternate half cycles of controlled rectifier anode voltage. For a given polarity of error signal one pair of controlled rectifiers is fired and the other is cut off. Thus the output voltage of the firing pair of controlled rectifiers is applied to the X and Y motor phases to proportionally control the motor 20.

The error signal is amplified by preamplifier 30 and then applied to square root circuit 90 which provides an amplified output closely approximating the square root of the error signal. The square root voltage is applied to pedestal generator 100 which includes a pulse forming network energized by reference voltage having a sinusoidal wave form and which augments the compensated input to the pedestal generator from the square root circuit. The pedestal generator samples the in phase input signals only at peak values, thus providing quadrature rejection and producing a square wave form output pedestal voltage whose fundamental frequency lags the reference voltage by 90°.

Pedestal generator 100 is connected to mixer-amplifier 180 and feeds a square wave pedestal voltage into the mixer amplifier. A rectified rider voltage is also fed into mixer-amplifier 180 where it is superimposed on the square wave pedestal voltage. The rectifier rider voltage is produced in rider generator circuit comprising rider generator 200 and full wave rectifier 220.

The rider generator 200 is connected to the same source of power supply as the anodes of the controlled rectifiers which when fired pulse the electric servo motor 20. The wave form produced by the rider generator is therefore in synchronization with respect to the controlled rectifier anode voltage. The rider generator produces a voltage of increasing monotonic wave form which is superimposed on a constant amplitude square wave to obtain the desired voltage level. The voltage of increasing monotonic wave form produced by the rider generator is a cosine function and compensates for the non-linearity in the static gain of the firing curve of the controlled rectifiers firing curve. The output of the rider generator is fed into the full wave rectifier 220. Full wave rectifier 220 inverts alternate half cycles of the rider voltage to permit symmetrical firing of the controlled rectifiers during each half cycle of controlled rectifier anode voltage. The rectified rider voltage of increasing monotonic wave form thus formed is fed into the mixer-amplifier 180 where it is, as before mentioned, superimposed on the pedestal voltage.

The mixer-amplifier 180, in the preferred embodiment, divides the pedestal voltage into positive and negative channels and the rectified rider voltage is summed in each channel in a parallel resistance network. The positive and negative voltages thus formed are fed into separate channels provided in the pulse generator 280.

Pulse generator 280 performs the function of supplying a timed voltage to the controlled rectifiers in the controlled rectifier output stage which, when caused to fire by the timed voltage, pulse the two phase electric servo motor 20 to thereby operate the motor.

The firing of the controlled rectifiers which pulse the electric servo motor 20 is achieved by forming current pulses in pulse generator 280 and applying these current pulses or gating signals to the gating terminals of the controlled rectifiers. The gating signals are in the form of condenser discharge pulses having an initial amplitude and decay time of 20 micro seconds or less. Two sets of controlled rectifiers are employed in the controlled rectifier output stage 18, one set for each direction of rotation. Each set of controlled rectifiers consists of a pair of controlled rectifiers which provide full wave control as they pulse the motor 20 during each half cycle of controlled rectifier anode supply voltage. The speed at which electric servo motor 20 is driven depends upon the angle at which the controlled rectifiers of each set are fired in their respective half cycles of anode supply voltage. As the controlled rectifiers are fired later in their respective half cycles of anode supply voltage, less fundamental frequency will flow into phase y of the electric servo motor 20 thus slowing the motor. Conversely, as the controlled rectifiers are fired earlier in their respective half cycles of anode voltage, more fundamental frequency will flow into phase y of the electro servo motor 20 thus increasing the speed of the motor.

As before mentioned the condenser discharge pulses have an initial amplitude and a decay time of 20 micro seconds or less. To vary the firing angle at the controlled rectifiers, it is therefore necessary to vary the time in the firing cycle when the gating pulses occur. This is achieved by having the input signal to the pulse generator from the mixer-amplifier 180 reach the critical voltage at the proper time in the cycle. To achieve this result rider generator 200 produces the before mentioned voltage of increasing monotonic wave shape which is synchronized with respect to the controlled rectifier anode voltage and superimposed on the pedestal voltage in the mixer-amplifier 180. When the mixed voltage output from the mixer-amplifier reaches a critical firing voltage condenser discharge pulse is triggered in the pulse generator 280, the unijunction transistor is biased to conduct, and the controlled rectifiers are fired.

From the foregoing description it will be apparent to one skilled in the art that the control system of the instant invention provides a unique, new and novel light weight compact means for continuously proportionally full wave controlling a two phase electric servo motor in such a manner that it has maximum speed of response and integral horse power characteristics.

An alternative form of the invention whereby half wave motor drive is effected is shown schematically in FIGURES 2 and 4 when read together. In the alternative form of the invention mixer-amplifier 180″ produces a single mixed output voltage which is fed into a single control channel provided in the pulse generator 280″ and controls a single set of control rectifiers located in the controlled rectifier output stage 18″ to provide half wave motor drive. The component parts of the mixer-amplifier, pedestal generator, controlled rectifier and electric motor circuit of the alternative form of the invention find comparable components interconnected in the same manner in the preferred embodiment of the invention. Therefore, the components of the alternative form of the invention which correspond to components in the preferred form of the invention will be given double primed reference numerals which correspond therewith.

In both the preferred embodiment of the invention and the alternative form of the invention the pedestal generator output is amplified in transistor 230 and fed into the mixer-amplifier by lead 235.

The alternative and preferred form of the invention differ, however, in that in the alternative form of the invention the output lead 235 of transistor 230 is directly connected to the base of second stage transistor amplifier 250″. It will be seen, therefore, that the coupling splitting transformer 242 of the preferred form of the invention has been eliminated from the alternative form of the invention.

In the alternative form of the invention the rider generator output lead 229 is provided with a resistance 249 therein and connects to the base of transistor 250″, whereby the rider voltage is superimposed on the pedestal voltage.

Transistor 250″ is connected to the input winding of coupling transformer 270″ whereby the mixer-amplifier 180″ is operably connected to pulse generator 280″.

Pulse generator 280″ has one control channel and as the components thereof are connected together in the same manner as the components of each pulse generator control channel of the preferred form of the invention the manner in which they are interconnected will not be described. Further, pulse generator 280″ operates to position modulate the mixed output from mixer-amplifier 180″ with respect to time in the same manner as the control channels of pulse generator 280 operate to position modulate the positive and negative mixed outputs from mixer-amplifier 180. The output of pulse generator 280″ is through saturable transformer 296″. Saturable transformer 296″ has two isolated output windings 330″ and 332″. The output leads of output windings 330″ and 332″ are connected to the gating terminals 338″ and 340″ of controlled rectifiers 346″ and 348″, respectively. The output leads of output windings 330″ and 332″ are connected to the controlled rectifier anode cathode circuit at points 354″ and 356″, respectively. The reference voltage input leads 362″ and 364″ connect to the controlled rectifier anode cathode circuit at point 354″ and between the X and Y motor phases at point 370″. The controlled rectifier circuit is completed by connecting the anode of controlled rectifier 346″ to the X phase of motor 20″ at point 372″ and the cathode of controlled rectifier 348″ to the Y phase of motor 20 at point 374″.

In the half wave control system just described the fundamental component of the controlled rectifier anode voltage is divided between the X and Y phases of motor 20. Pulse generator 280″ has only one control channel, therefore gating pulses are applied to the gating terminals of the controlled rectifiers 346″ and 348″ only in alternate half cycles of controlled rectifier anode supply voltage and consequently provides half wave motor control. Depending upon the input signal polarity, one of the motor windings will draw a leading current and the other a lagging current with respect to the controlled rectifier anode voltage. A reversible torque is therefore produced.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control circuit for an electric servo motor, comprising controlled rectifier means having a gating terminal, said controlled rectifier means having an anode-cathode circuit operatively connected to said motor and to a reference voltage, said controlled rectifiers controlling the speed of said motor as a direct function of the time in the cycle of controlled rectifier-anode supply voltage that said controlled rectifier means receives a gating pulse; means generating a square wave pedestal voltage the amplitude of which varies as a direct function of an error signal, means generating a rider voltage of increasing monotonic wave form synchronized with respect to a sinusoidal reference voltage, mixing means operable to superimpose said rider voltage on said pedestal voltage thereby producing a mixed output voltage, pulse generating means connected to said mixing means and the gating terminals of said controlled rectifier means operable to apply said mixed voltage to the gating terminal of said controlled rectifiers at a time in the cycle of anode supply voltage which varies as a direct function of the amplitude of said pedestal voltage.

2. The control circuit of claim 1 wherein the controlled rectifier anode supply voltage is of sinusoidal wave form and said rider voltage is synchronized with respect thereto.

3. The control circuit of claim 2 wherein said rider voltage of increasing monotonic wave form is a cosine function of said sinusoidal reference voltage.

4. The control circuit of claim 1 wherein said controlled rectifier means comprises a set of controlled rectifiers operable to split a control signal from said pulse generating means into positive and negative pulses and apply said pulses in quadrature to the separate phases of said motor in alternate half cycles of anode supply voltage whereby said motor is proportionally controlled.

5. A control system for a two-phase servo motor comprising: a two-phase proportionally controlled electric servo motor, a preamplifier control circuit adapted to receive an error signal, a square root generator circuit connected to said preamplifier circuit to take the square root of the error signal, a pedestal generator circuit connected to said square root generator circuit and including pulse forming means connected to a sinusoidal input reference voltage, the pedestal generator being operative to form a square wave pedestal voltage, a rider generator generating a rider voltage of increasing monotonic wave form synchronized with respect to said sinusoidal reference voltage; mixer means mixing said rider voltage and said pedestal voltage; at least one set of controlled rectifiers having an anode-cathode circuit operatively connected to said two-phase motor and to said sinusoidal reference voltage to proportionally control said motor, a gating terminal, and a pulse generator circuit connected to said gating terminal and to said mixer means and being operative to apply said mixed voltage to the gating terminal of said controlled rectifiers at a time in each cycle of supply of said reference voltage to said controlled rectifiers which varies directly as the amplitude of said error signal to vary the speed of said motor in accordance therewith.

6. In combination, a two-phase electric servo motor, square root generator means adapted to receive an error signal and having an output which is the square root of the error signal, pedestal generator means including a pulse forming network connected to a source of reference voltage and to the square root generator means and producing a square wave pedestal voltage, rider generator means connected to a reference voltage of sinusoidal wave form and producing a rider voltage of increasing monotonic wave form, full wave rectifier means connected to said rider generator and adapted to invert alternate half cycles of said rider voltage, mixer amplifier means connected to said pedestal generator and said full wave rectifier, and splitting the pedestal voltage into positive and negative channels and summing the full wave rectified rider voltage in each of said positive and negative channels, pulse generator means including a pulse forming network, a storage capacitor, and a unijunction transistor having two bases, said storage capacitor biasing said unijunction transistor to conduct through one of its bases upon receiving a predetermined voltage signal from said pedestal generator, a set of controlled rectifiers having an anode and cathode circuit operatively connected to said two-phase motor and to said source of reference voltage, and a gating terminal operatively connected to said one base of said unijunction transistor, said controlled rectifiers pulsing said electric motor at a rate of speed directly dependent upon the time in each cycle of said reference voltage in which a condenser discharge pulse is applied to said unijunction transistor.

7. The combination of claim 6 wherein said pulse generator means further comprises synchronizing means connected to said unijunction transistor adapted to maintain said unijunction transistor in a conducting state for a predetermined time interval.

References Cited in the file of this patent
UNITED STATES PATENTS

| | | |
|---|---|---|
| 2,627,594 | Sawyer et al. | Feb. 3, 1953 |
| 2,774,022 | Malick | Dec. 11, 1956 |
| 2,977,523 | Cockrell | Mar. 28, 1961 |
| 2,987,666 | Manteuffel | June 6, 1961 |
| 3,109,971 | Welch et al. | Nov. 5, 1963 |

OTHER REFERENCES

Controlled Rectifier Drive A.C. and D.C. Motors, Electronics, November 13, 1959, pages 73–75, page 75, Fig. 7.